(12) United States Patent
Morito et al.

(10) Patent No.: US 7,160,568 B2
(45) Date of Patent: Jan. 9, 2007

(54) METHOD FOR MAKING A TRIANGULARLY-SHAPED, BAKED DOUGH PRODUCT

(75) Inventors: Toshimitsu Morito, Utsunomiya (JP); Yoshitaka Sakai, Utsunomiya (JP)

(73) Assignee: Rheon Automatic Machinery Co., Ltd., Tochigi-Ken (JP)

( * ) Notice: Subject to any disclaimer, the term of this patent is extended or adjusted under 35 U.S.C. 154(b) by 371 days.

(21) Appl. No.: 10/169,807

(22) PCT Filed: Nov. 13, 2001

(86) PCT No.: PCT/JP01/09900

§ 371 (c)(1),
(2), (4) Date: Jul. 9, 2002

(87) PCT Pub. No.: WO02/39819

PCT Pub. Date: May 23, 2002

(65) Prior Publication Data

US 2003/0180427 A1 Sep. 25, 2003

(30) Foreign Application Priority Data

Nov. 14, 2000 (JP) .............................. 2000-347220

(51) Int. Cl.
*A21D 6/00* (2006.01)
*A21D 8/02* (2006.01)
(52) U.S. Cl. ...................... 426/497; 426/503
(58) Field of Classification Search ............... 426/496, 426/518, 503, 497, 478, 446, 466, 389–391; 99/427, 430, 426, 443; 249/160, 161, 171, 249/216, 155–158

See application file for complete search history.

(56) References Cited

U.S. PATENT DOCUMENTS

| 1,814,485 A | 7/1931 | Moss |
| 2,494,236 A | 1/1950 | Goldstein ...................... 107/1 |
| 2,590,823 A * | 3/1952 | Rhodes .......................... 53/58 |
| 3,782,271 A | 1/1974 | Tobey et al. ............... 99/450.6 |
| 5,795,607 A | 8/1998 | Haas et al. ................. 426/391 |
| 6,505,809 B1 * | 1/2003 | Reed ........................... 249/95 |

FOREIGN PATENT DOCUMENTS

| CH | 657 016 | 8/1986 |
| DE | 297 19 172 U1 | 12/1997 |
| GB | 2 217 171 A | 10/1989 |
| GB | 2 266 221 A | 10/1993 |
| GB | 2 283 159 A | 5/1995 |
| JP | 60-24152 | 7/1985 |

OTHER PUBLICATIONS

Ehrlich, Joel. "Two Recipes for Baklava, from Diki Shamlian Gust and Joel Ehrlich". listserve posting, Jul. 11, 1995 [retrieved from Internet Dec. 30, 2004]. URL<http://www.boston-baden.com/hazel/Sweets/baklava>.*

(Continued)

Primary Examiner—Arthur L. Corbin
(74) Attorney, Agent, or Firm—Finnegan, Henderson, Farabow, Garrett & Dunner, L.L.P.

(57) ABSTRACT

Confectionery, such as a tart and pie, is sequentially made. A generally rectangular mold is filled with food dough. The food dough is baked and taken out of the mold. The food dough is cut and divided in a zigzag pattern into generally triangularly-shaped food dough, so that a tart or a pie is made.

4 Claims, 6 Drawing Sheets

OTHER PUBLICATIONS

"Collection (3) Banana Bread". Google groups: Mar. 13, 1999. [retrieved Dec. 30, 2004]. URL<http://groups-beta.google.com/group/rec.food.recipes/browse_thread/thread/df628c056b012ea2/3d237c69bdca258f?q=bread+bake++loaf+pan+cut&_done>.*

* cited by examiner

METHOD FOR MAKING A TRIANGULARLY-SHAPED, BAKED DOUGH PRODUCT

TECHNICAL FIELD

This invention relates to an apparatus and method for making a food product, such as a pie and a tart, by manufacturing steps at a factory. This apparatus and method allow the rate of production of a food product to be increased and the cost for making it to be decreased. Also, the food product tends to be crispy when it is eaten.

BACKGROUND ART

When a tart or a pie is made by hand, first food dough is formed as a disc. Then various toppings are put on it. Then it is baked. When it is eaten, the circular sheet of food dough is radially cut at the same given angles and divided into triangles (or fans).

When a tart or a pie is made at a factory, first a sheet of dough is made. Then, a cutter is used to cut out discs from the sheet. In that case a part of the sheet remains after the discs are cut out from the sheet. Although it is again used, the yield of the discs is still low. Thus, it is desired that the method of making the food product be improved, so that the rate of production can be increased and so that the cost of production can be decreased.

The conventional method has the above disadvantages, i.e., neither the rate of production can be increased nor the cost for production be decreased.

The object of this invention is to provide an apparatus and method for making a tart and a pie that look handmade. The apparatus and method allows the rate of production to be increased.

DISCLOSURE OF INVENTION

To achieve the object of this invention a method for making a food product is provided.

The method includes the steps of filling a tetragonal mold with food dough, baking the food dough that fills the tetragonal mold, taking out the food dough from the mold, and cutting and dividing the food dough in a zigzag pattern at given positions into pieces that are generally triangular.

Also, another method for making a food product is provided. It includes the steps of continuously transferring tetragonal molds along a conveyor, supplying food dough to the molds with an apparatus that is located above the conveyor, baking the food dough that fills the tetragonal molds, taking out the food dough from the molds, and cutting and dividing the food dough in a zigzag pattern at given positions into pieces that are generally triangular. Each mold can be a parallelogram. Each mold has one pair of side plates. Each side plate comprises a plurality of arced plates that are connected to each other. The food dough that is supplied to the molds is a multi-layered food dough.

An apparatus for making a food product is provided. It comprises a conveyor for sequentially feeding tetragonal molds, an apparatus for supplying an underlying sheet of dough to cover the side and bottom surfaces of the molds, an apparatus for supplying a sheet of dough on the underlying sheet of dough, and means for taking out the molds from the conveyor. The apparatus can further comprise means for baking the sheets of dough that fill the molds, means for taking the baked sheets of dough from the molds, and a cutter to cut the baked sheets of dough into pieces.

BEST MODE FOR CARRYING OUT THE INVENTION

Figure 1:
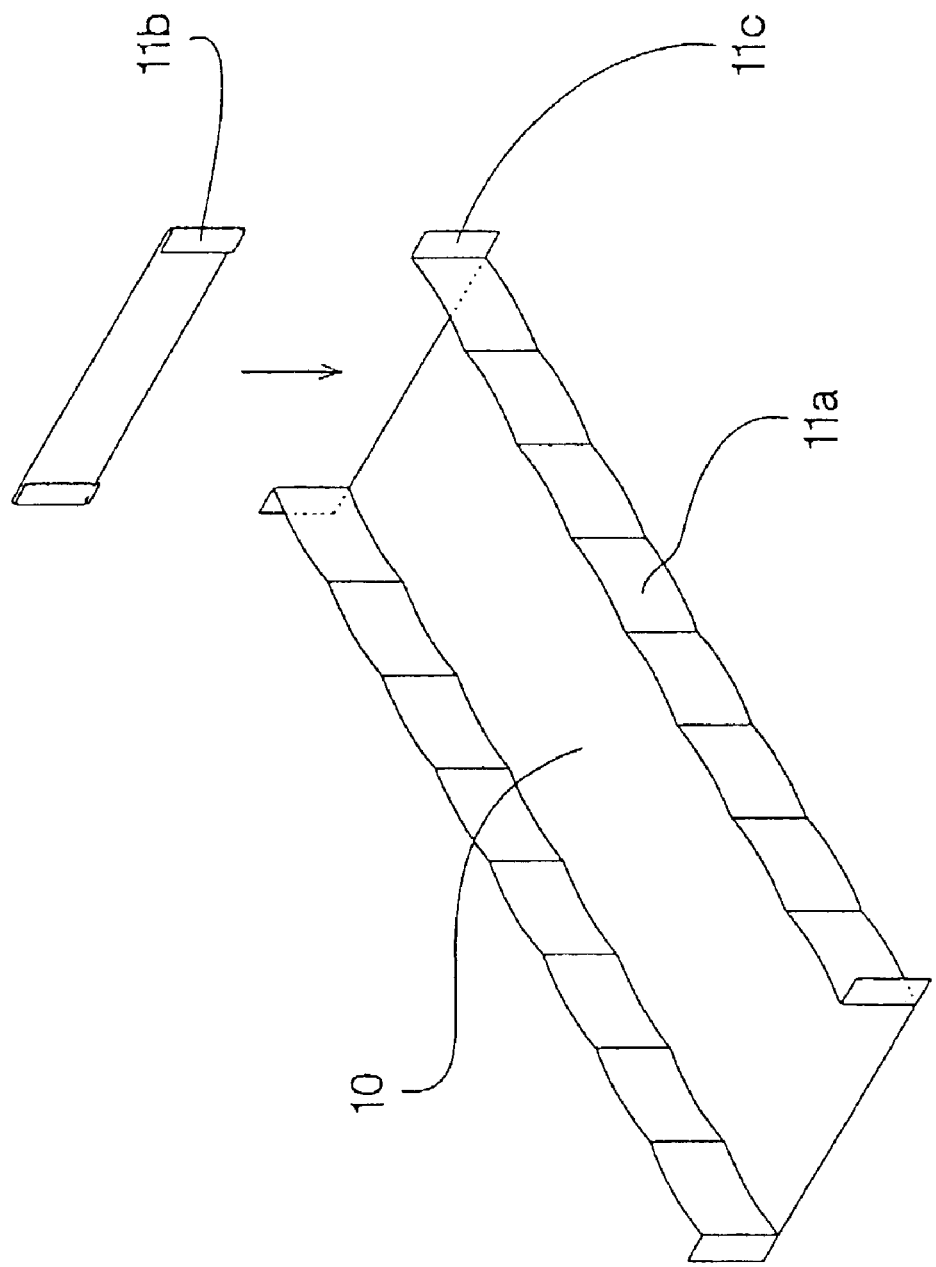
FIG. 1 is a perspective view of a mold of an embodiment of this invention.
Figure 2:
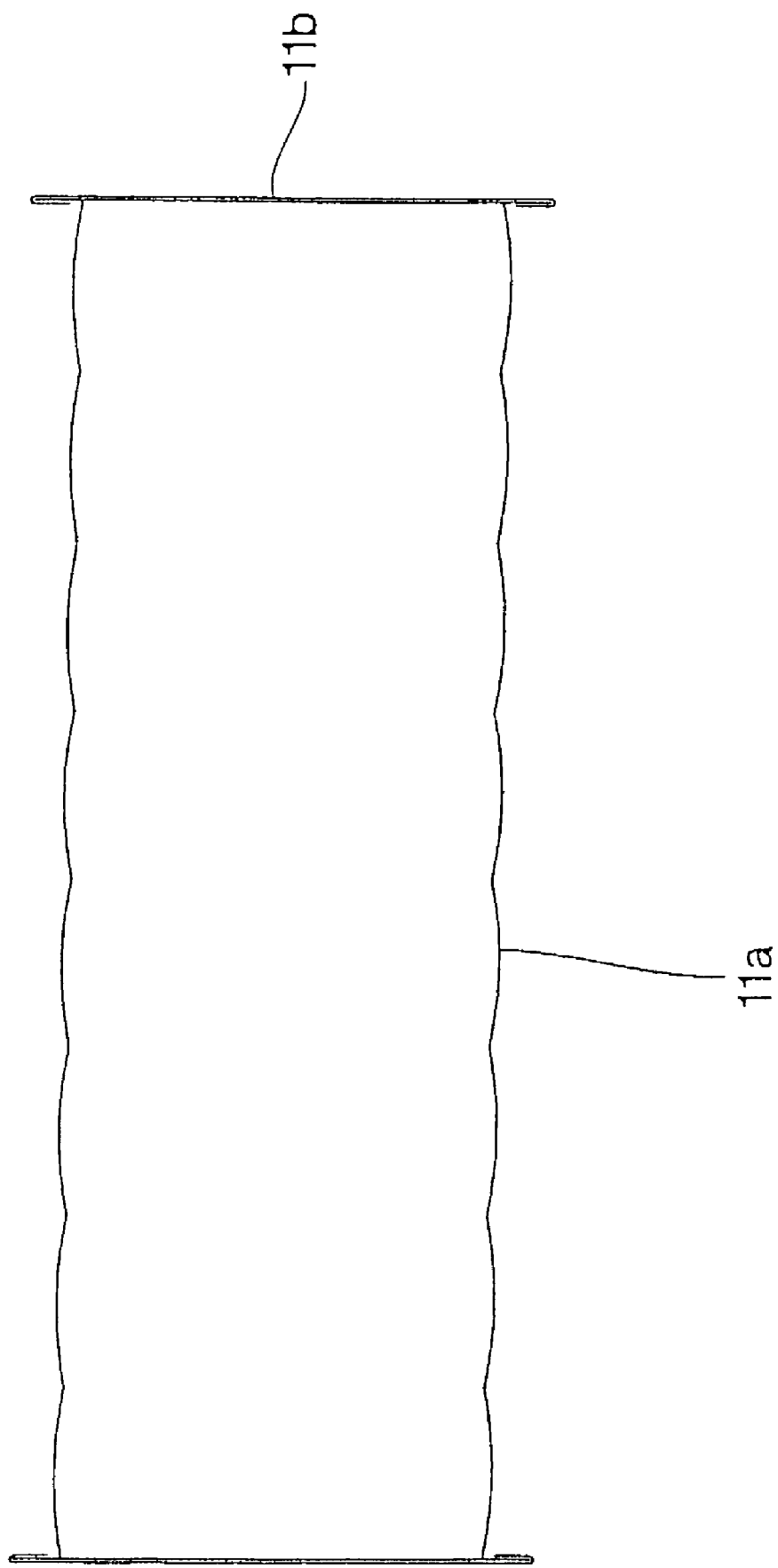
FIG. 2 is a plan view of the mold of the embodiment of this invention.

Based on the drawings, a first embodiment of this invention is now explained. FIG. 1 shows a mold 10. It has two pairs of opposite side plates 11a and 11b and a bottom plate. The two pairs of opposite plates 11a and 11b are used as side frames. As in FIG. 2, one pair of the opposite plates 11a has a plurality of curved plates (or arced plates or portions). At the other pair of the opposite sides of the mold, the other pair of the opposite plates 11b is located. The ends of each transverse plate 11b are engaged with engaging portions 11c formed at the ends of the side plates 11a.

Figure 3:
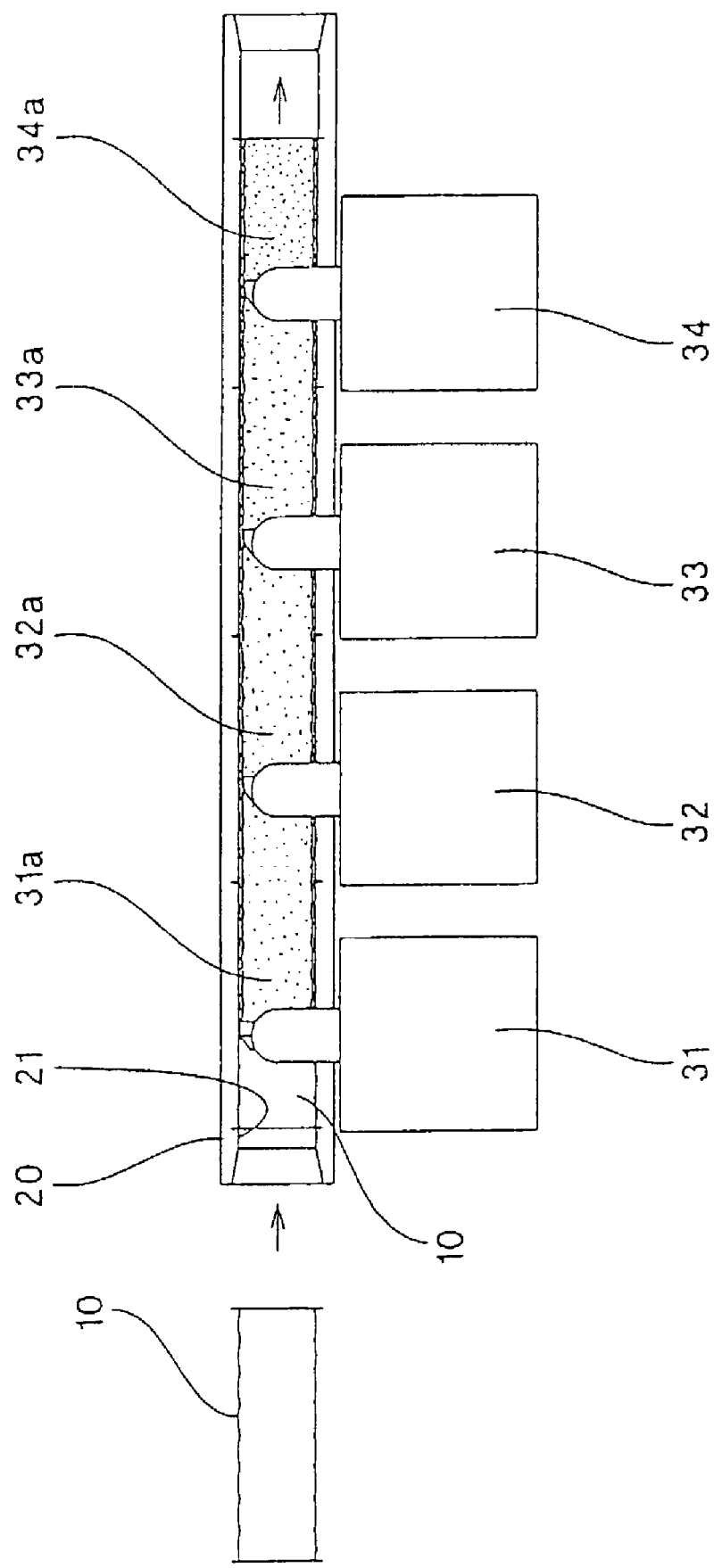
FIG. 3 is a top view of an embodiment of a manufacturing line of this invention.

FIG. 3 is a top view of a conveyor 20. Opposite guide plates 21 are located above it and along the direction of its length. The mold 10 is conveyed along the guide plates 21.

Figure 4:
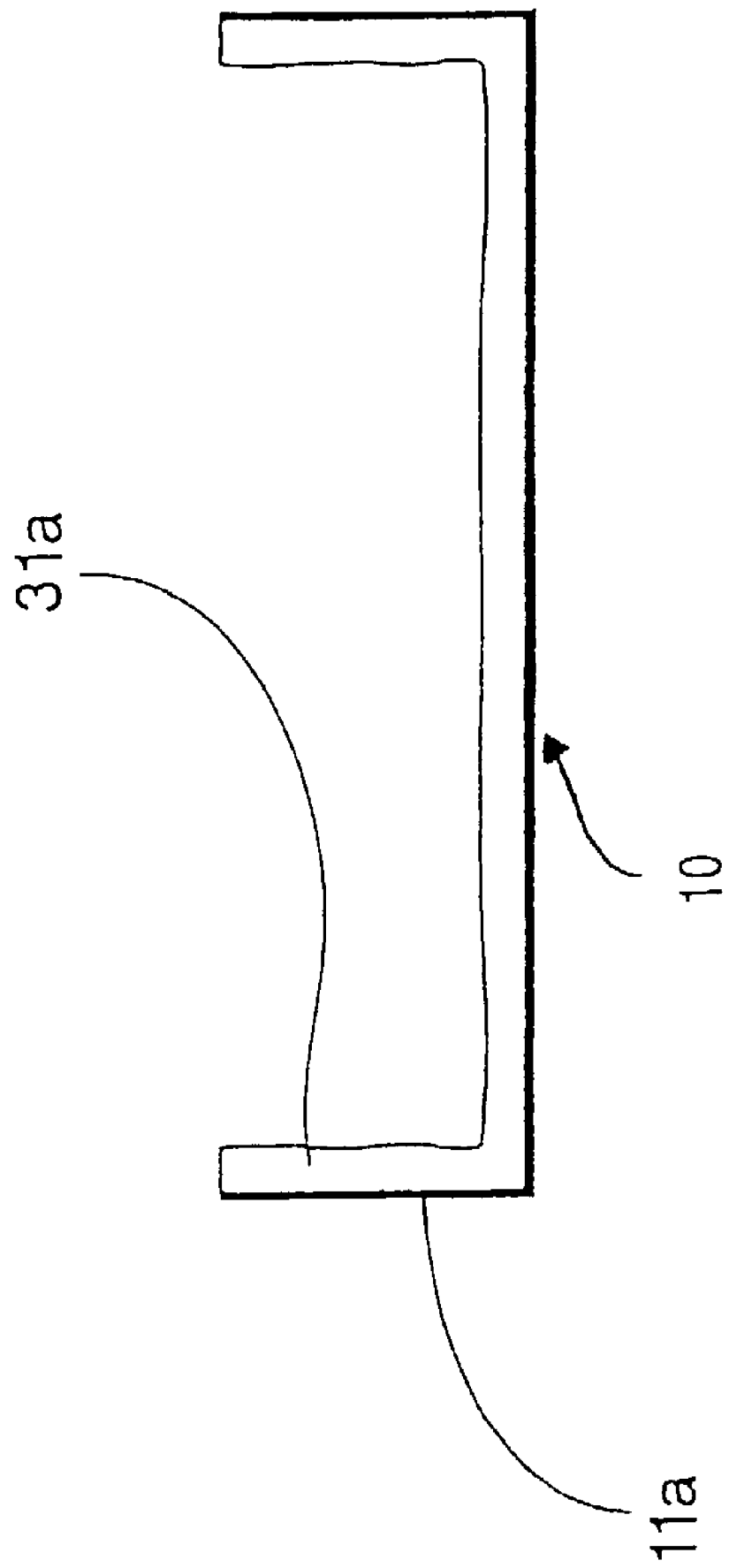
FIG. 4 is a cross sectional view of the mold on which an underlying sheet of dough is put.

Apparatuses 31, 32, 33, and 34 are located in series to supply food dough to the mold 10. The apparatuses sequentially supply food dough to the mold, so that multiple layers of food dough can be formed in the mold 10. In this embodiment a first apparatus 31 for supplying food dough has a nozzle whose sectional view appears like a "U." Thus, the first apparatus 31 supplies to the mold an underlying sheet 31a of dough formed like a "U, so that, as in FIG. 4, it covers both the side plates 11a and the bottom plate of the mold.

Next a first embodiment of a method for making tarts of this invention by using a plurality of the molds 10 is explained. The conveyor 20 continuously feeds the molds 10. The first apparatus 31 sequentially supplies food dough 31a to the molds. Then the apparatuses 32, 33, and 34 also continuously supply food dough 32a, 33a and 34a to the molds. In each mold a multi-layered food dough is formed. The multi-layered food dough is continuous over a plurality of the molds.

Then, the transverse plates 11b are inserted into the multi-layered food dough at the ends of the molds, so that the continuous multi-layered food dough is divided into blocks in respective molds. Then, they are sequentially taken out from the conveyor and baked.

Figure 5:
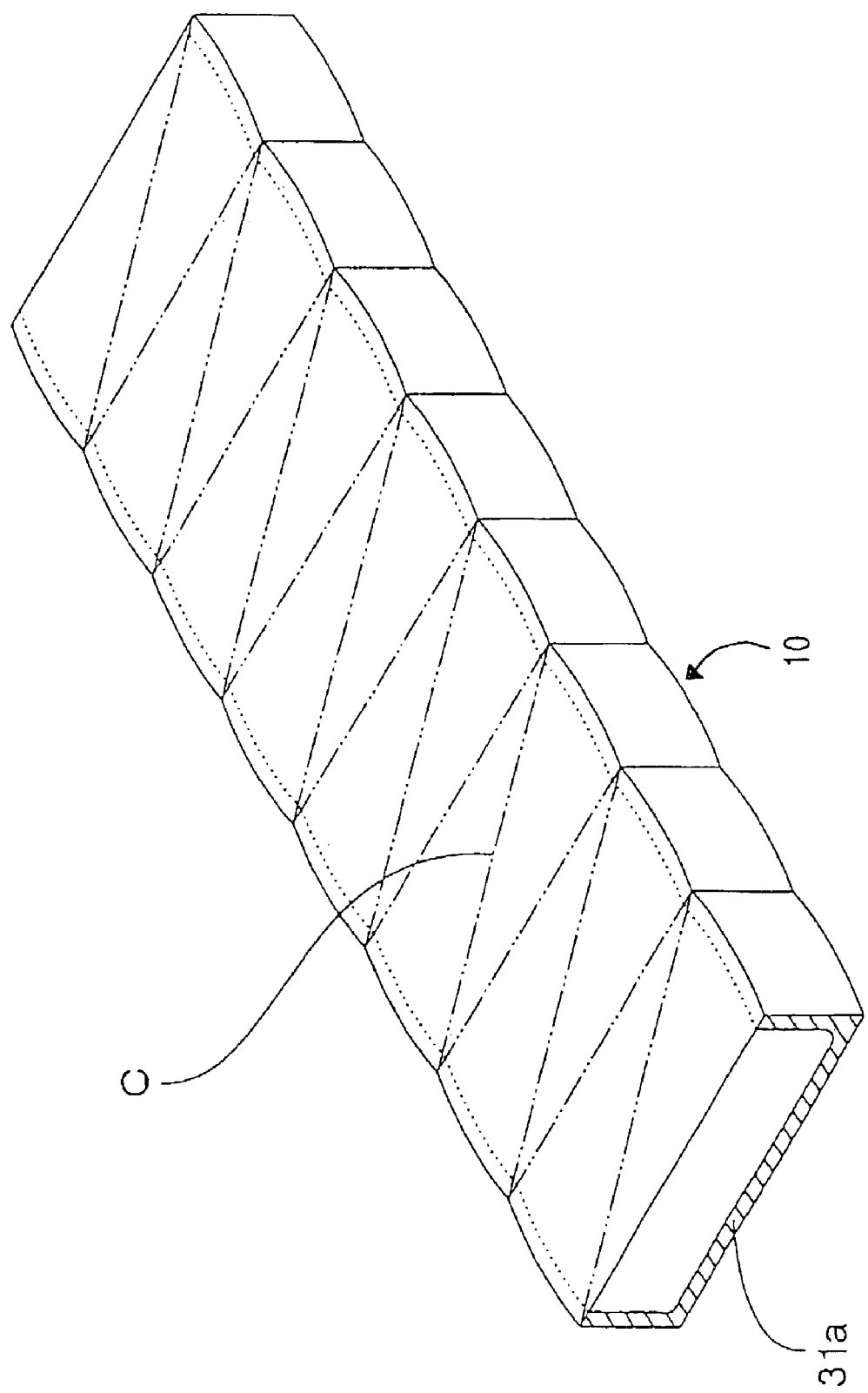
FIG. 5 is a perspective view of the mold and a baked tart.

As in FIG. 5, each baked food dough includes tarts that are connected to each other, so that at the long sides of the baked food a plurality of arced surfaces are connected in series. The baked food dough is cut and divided into generally triangularly-shaped food dough along a line as shown by an imaginary line C of two short dashes that alternate with one long dash, as in FIG. 5.

Each generally triangularly-shaped food dough has a tip that is covered by the underlying sheet of food dough, unlike the triangularly-shaped food dough that is made by the conventional method. Thus, the generally triangularly-shaped food dough made by this embodiment can be easily treated, in comparison with the conventional food dough.

Also, it is difficult to break the generally triangularly-shaped food dough made by this embodiment.

Figure 6:
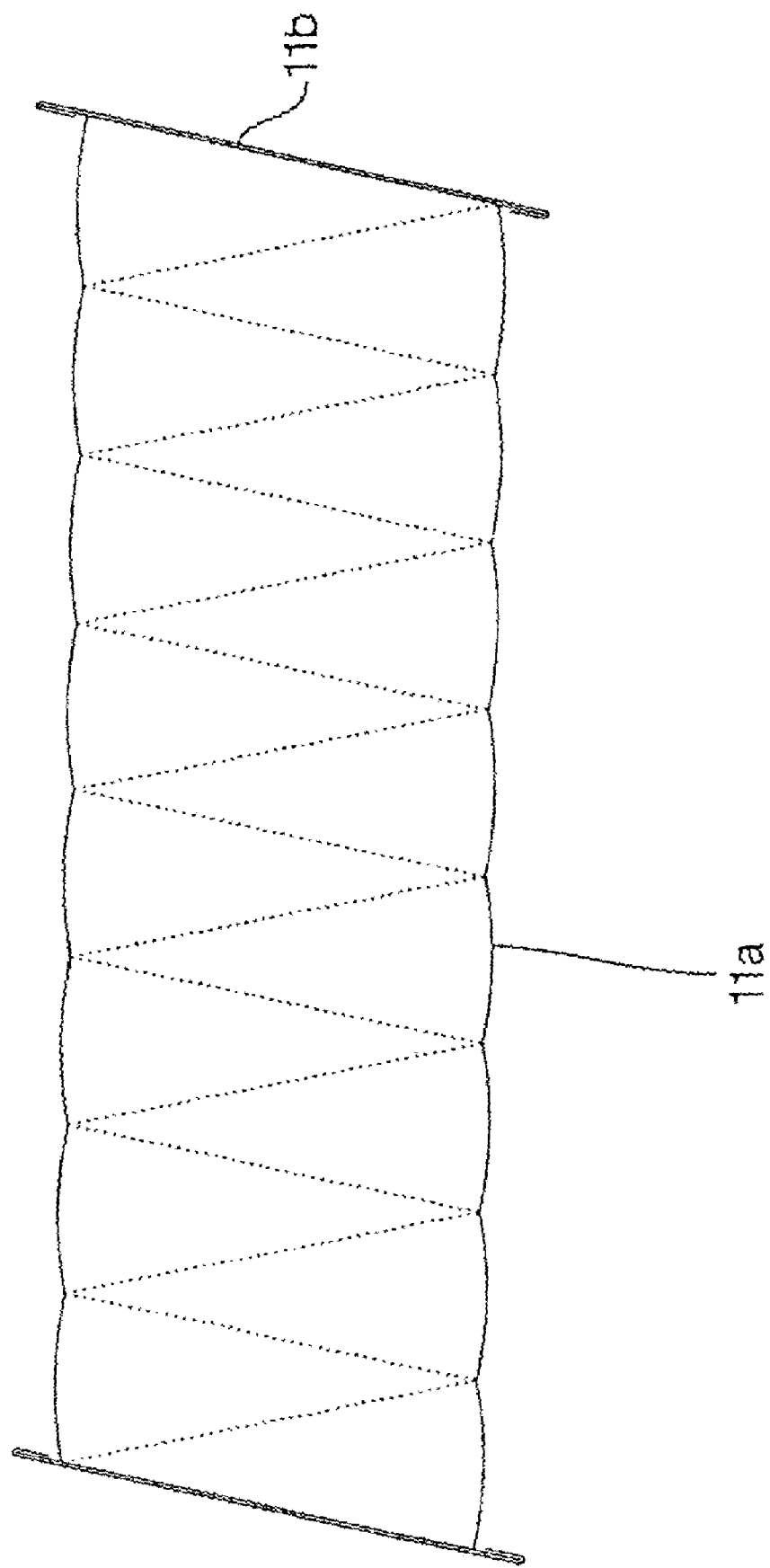
FIG. 6 is a plan view of another embodiment of a mold of this invention.

As stated above, the first embodiment of the mold in FIG. 5 is used to make a basically rectangularly-shaped food dough. That mold has two sides, comprising a plurality of arced plates that are oppositely arranged. However, a mold shaped as a parallelogram may be used. FIG. 6 shows a second embodiment of a mold shaped basically as a parallelogram. In this embodiment two opposing side plates 11a, comprising a plurality of arced plates, are slightly shifted, unlike the first embodiment. This embodiment allows tarts with the shape of triangles to be obtained, in comparison with the first embodiment.

In the first and second embodiments, the transverse plates 11b can be disengaged from the mold. However, they can also be fixed to it. In this case, the apparatuses 31, 32, 33, and 34 supply food dough to respective molds. When the molds are conveyed by the conveyor at regular intervals so that spaces are put between adjacent molds, the apparatuses 31, 32, 33, and 34 intermittently supply food dough to the molds, i.e., not in the spaces.

In the embodiments stated above, a plurality of the apparatuses for supplying food dough to the molds are used to form multi-layered food dough in the molds. However, a single apparatus that can supply multi-layered food dough to the molds may also be used. Also, in the embodiments stated above, food dough for a tart is formed as a multi-layered food dough. However, these embodiments can be used for food dough such as a pie or pizza that comprises a single layer.

In the conventional method, disc-like sheets of dough are cut out from a sheet of dough. Then, some of the disc-like sheets of dough are layered to make tarts. In contrast, this invention uses continuous sheets of dough so that tarts can be sequentially made.

Also, in the conventional method, each disc-like sheet is radially cut at given angles. At the center of the disc-like sheet the disc-like sheet is cut many times. Thus, the tips of the pieces that are formed at the center of the disc-like sheet tend to be readily broken. In contrast, this invention allows food dough in the mold to be cut in a zigzag pattern. Thus, according to this invention the tips of the pieces tend not to be easily broken.

According to this invention no operation to cut out disc-like pieces of dough from a sheet of dough is necessary. Also, according to this invention food products can be made from a continuous sheet of dough, so that no wasted piece is made. Thus, the rate of production can be increased.

The invention claimed is:

1. A method for making a food product comprising the steps of conveying along a conveyor a plurality of rectangular-shaped molds that are open at ends thereof and connected in series to each other at their open ends, each of said rectangular-shaped molds having a pair of opposing side plates, each of the opposing side plates having a plurality of arced portions that are connected in series to each other; continuously filling food dough into the plurality of rectangular-shaped molds with an apparatus located above the conveyor; thereafter pulling removable and transverse plates, in a vertical direction, perpendicularly across the opposing side plates of the rectangular-shaped molds, at each end of each rectangular-shaped mold, to divide the food dough at each end of the rectangular-shaped molds, to close the ends of the rectangular-shaped molds and to form a plurality of separate rectangular-shaped molds; baking the food dough in the separate rectangular-shaped molds; removing the baked food dough from the separate rectangular-shaped molds; and cutting and dividing the removed baked food dough in a zigzag pattern by cutting the removed baked food dough, along lines connecting ends of arced surfaces of a pair of opposing sides of the removed baked food dough, formed by the arced portions of the opposing side plates of the separate rectangular-shaped molds, into pieces that are substantially triangularly-shaped.

2. The method of claim 1, wherein said food dough that is filled into the rectangular-shaped molds is a multilayered food dough.

3. The method of claim 1, wherein the arced portions of the opposing side plates are directly opposite each other.

4. The method of claim 1, wherein the arced portions of the opposing side plates are shifted relative to each other.

* * * * *

UNITED STATES PATENT AND TRADEMARK OFFICE
CERTIFICATE OF CORRECTION

PATENT NO.       : 7,160,568 B2
APPLICATION NO.  : 10/169807
DATED            : January 9, 2007
INVENTOR(S)      : Toshimitsu Morito et al.

It is certified that error appears in the above-identified patent and that said Letters Patent is hereby corrected as shown below:

Col. 4, line 18, "pulling" should read -- putting --.

Signed and Sealed this

First Day of September, 2009

David J. Kappos
*Director of the United States Patent and Trademark Office*